United States Patent
Shipp

(10) Patent No.: US 7,493,658 B2
(45) Date of Patent: Feb. 17, 2009

(54) SYSTEM FOR AND METHOD OF DETECTING MALWARE IN MACROS AND EXECUTABLE SCRIPTS

(75) Inventor: Alexander Shipp, Gloucester (GB)

(73) Assignee: MessageLabs Limited, Gloucester (GB)

( * ) Notice: Subject to any disclaimer, the term of this patent is extended or adjusted under 35 U.S.C. 154(b) by 631 days.

(21) Appl. No.: 10/500,952

(22) PCT Filed: Jan. 19, 2004

(86) PCT No.: PCT/GB2004/000214

§ 371 (c)(1), (2), (4) Date: Sep. 3, 2004

(87) PCT Pub. No.: WO2004/088483

PCT Pub. Date: Oct. 14, 2004

(65) Prior Publication Data

US 2005/0071649 A1    Mar. 31, 2005

(30) Foreign Application Priority Data

Apr. 3, 2003    (GB) ................................ 0307736.9

(51) Int. Cl.
*H04L 21/00*    (2006.01)

(52) U.S. Cl. .................................................. 726/24

(58) Field of Classification Search ................ 726/22, 726/24; 713/188

See application file for complete search history.

(56) References Cited

U.S. PATENT DOCUMENTS

| 5,907,834 | A | 5/1999 | Kephart et al. |
| 7,134,141 | B2 * | 11/2006 | Crosbie et al. ................. 726/23 |
| 7,210,041 | B1 * | 4/2007 | Gryaznov et al. ........... 713/188 |
| 2002/0066024 | A1 | 5/2002 | Kwan |
| 2003/0120953 | A1 * | 6/2003 | Radatti ........................ 713/201 |

FOREIGN PATENT DOCUMENTS

| WO | 02/10888 A2 | 7/2001 |
| WO | WO 02/10888 | 2/2002 |

OTHER PUBLICATIONS

Weber M et al: "A toolkit for detecting and analyzing malicious software" Proceedings of the 18th Annual Computer Security Applications Conference Dec. 9, 2002 pp. 423-431 XP010627054 paragraphs 0003, 03.1, 03.3, 03.4.

Veldman F: "Combating Vruses Heuristically" Virus Bulletin Conference, Virus Bulletin Ltd., Abington, GB, Sep. 1993 pp. 67-75 XP000828110 paragraphs 03.2, 03.3.

* cited by examiner

*Primary Examiner*—Andrew L Nalven
(74) *Attorney, Agent, or Firm*—Nixon & Vanderhye, PC

(57) ABSTRACT

An anti malware scanner for files is provided with means for processing script and macro files and flagging them as suspect or not based upon an automated analysis of source code in the file. This analysis involves separating the program source into groups of parts such as comment, variable names and routine names, eliminating duplicates and performing a character frequency distribution analysis of the resulting strings. The system may include an exception list to omit flagging a file as suspect if it is on the exception list.

14 Claims, 1 Drawing Sheet

SYSTEM FOR AND METHOD OF DETECTING MALWARE IN MACROS AND EXECUTABLE SCRIPTS

This application is the U.S. national phase of international application PCT/GB2004/000214, filed 19 Jan. 2004, which designated the U.S.. PCT/GB2004/000214 claims priority to GB Application No. 0307736.9, filed 03 Apr. 2003. The entire contents of these applications are incorporated herein by reference.

BACKGROUND AND SUMMARY

The present invention relates to a method of, and system for, heuristically detecting malware in macros and executable scripts, by checking for the presence of encoded strings.

Viruses and other forms of malware (malicious software) pose an ever-increasing problem for computer users and users of the internet. Early viruses tended to be spread as binary executables which would execute on computers of a known type. A traditional measure against virus infections is anti-virus file scanning in which a file, treated as a succession of bytes, is scanned looking for byte patterns that have been identified as characteristic signatures of known malware. This virus scanning may take place on files stored on a local or network disk drive or files which are in transit on a network, with the scanning taking place as they pass by a particular node on the network or pass through a network gateway such as an email gateway. Since the use of the internet for web access, email and other purposes has become widespread, and the software to be found on a typical user's machine has become more sophisticated, the opportunity has arisen for virus writers to create viruses which are distributed in essentially source code forms. These so-called script- or macro viruses rely on the user's computer having software on it which will act as an execution environment for a program, that is the virus, which arrives at the computer e.g. as an email attachment.

Features added to an operating system to increase the ease of use by non-technical users offer opportunities for virus writers to exploit. For example, Microsoft Windows has a facility whereby files having a certain file extension (that is, the character(s) following the final "." in the file name) are associated with a particular application program such that the act of the user "opening" the file in Windows' graphical user interface causes Windows to activate the associated program and load the file in question. This has provided the basis for recent script viruses which work by attaching a file containing the source code to an email which is then distributed to users; the file is given the extension necessary to activate the script host program on a recipient's computer. When the recipient opens the attachment, the host is activated and the files executed. There have been a number of virus outbreaks in which the virus is spread as a script for the Visual Basic Scripting host on Windows machines.

Similarly, a number of end-user applications such as word processors and spreadsheets incorporate a "macro" facility for enabling the user to automate repetitive or difficult tasks. The macro "language" involved may be of differing degrees of sophistication, with some, such as those found in Microsoft Office products, being very similar to parallel scripting languages. A minor difference is that scripts tend to be stored, on disk and elsewhere, purely in source code form, whereas macro files may include binary data as well as or instead of textual source code. For example, this binary data may include a "tokenised" version of the macro's source code, or actual executable machine codes.

In addition to Visual Basic Scripting and Microsoft Office macros, there are several computer languages where the source code is available in the executable file. This might be because the language is interpreted without being compiled, for example, Perl. Virus writers who use such mediums often try and make their creations hard to detect. They may do this writing code that is hard to understand. They may also write self modifying code, so that with each generation of the code, the code subtly changes. This is done in order to make it hard for anti-virus vendors to create signatures that detect the virus in all its infinite variations. They may also hide virus code in comments or strings. These are then read in, decrypted, and acted upon.

Signature-based scanning is ineffective against script- and source-code-only macro viruses, because their contents do not correspond one-for-one with machine instructions, since there are many different ways the same programmatic action may be expressed in source code and source code may be transformed in various ways, for example in terms of usage of "whitespace", i.e., space, tab and newline characters, or substitution of variable names which will alter the contents of the source code without altering its effect.

The present invention is based on an appreciation of the fact that, as regards script- and macro-viruses, in some of these cases, it is possible to heuristically detect the virus by frequency analysis of character counts in various parts of the program.

According to the present invention there is provided a system for scanning for malware a computer file containing source code of a computer program in a given computer language comprising:

means for separating the source code into groups of constituent parts corresponding to different structural parts of the program;

means for processing each part to count the number of occurrences in that part of characters of a character set to obtain a frequency distribution of characters in that part;

means for comparing the character frequency distribution of each part with an expected range of frequency distributions; and means for flagging the file as suspect or not depending on the result of one or more comparisons by the comparing means The invention also provides a method for scanning for malware a computer file containing source code of a computer in a given computer program language comprising:

separating the source code into groups of constituent parts corresponding to different structural parts of the program;

processing each part to count the number of occurrences in that part of characters of a character set to obtain a frequency distribution of characters in that part;

comparing the character frequency distribution of each part with an expected range of frequency distributions; and flagging the file as suspect or not depending on the result of one or more comparisons by the comparing means.

BRIEF DESCRIPTION OF THE DRAWING

The invention will be further described by way of non-limitative example with reference to the accompanying drawing, in which:—

DETAILED DESCRIPTION OF EXAMPLE EMBODIMENTS

Figure 1:
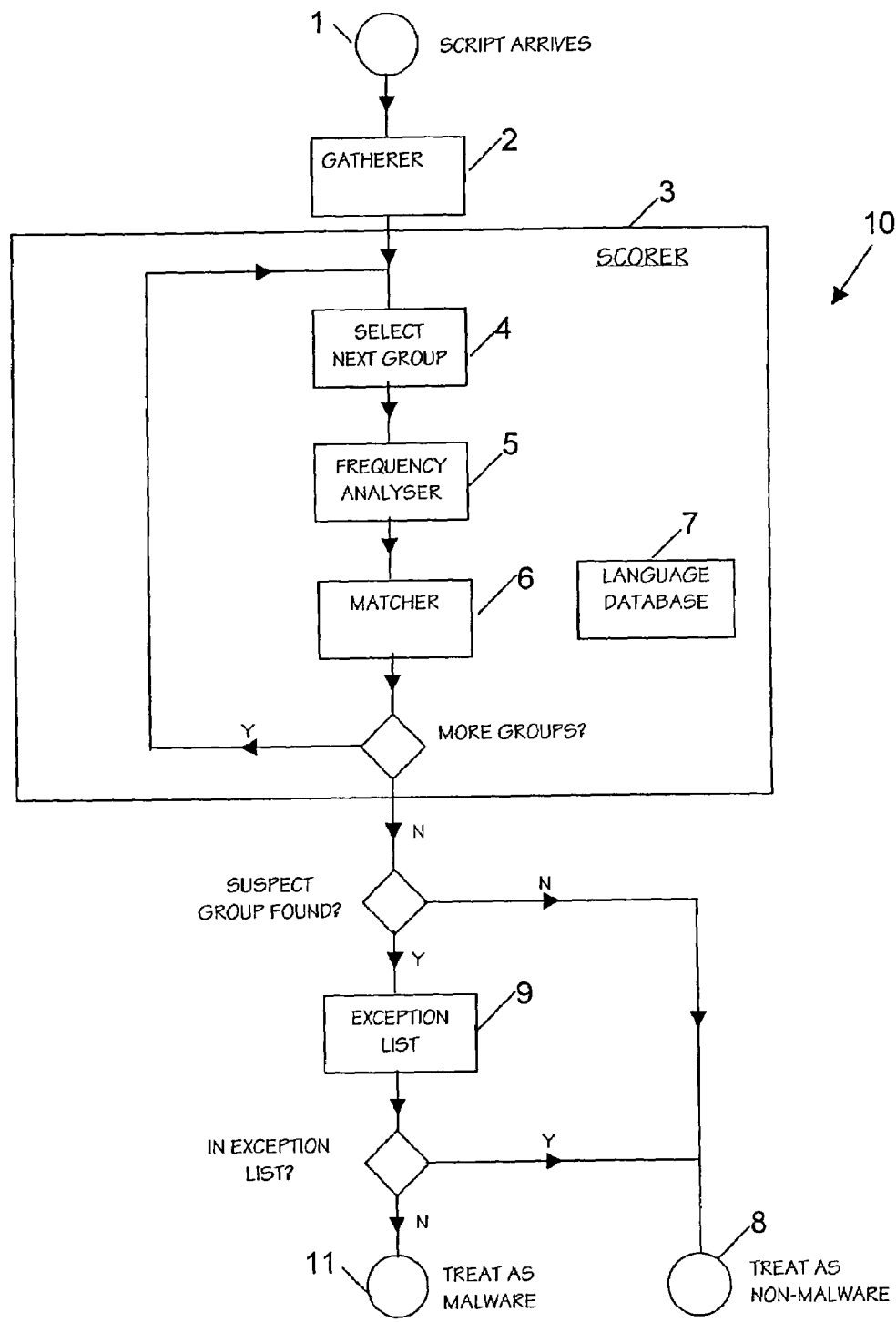
FIG. 1 is a combined block diagram of, and flow chart of the operation of, one embodiment of a system according to the present invention.

The embodiment of the invention illustrated in FIG. 1 is for use in an anti-virus scanning system, in which a succession of files are presented for scanning at an input 1, are subject to scanning by the system 10 and then flagged as possibly containing a virus depending on the result. The origin of the files is not material to the present invention: they may be files read in succession from a local or network disk-drive and may be the files ordinarily stored on the disk drive for its normal purpose or files which are created by the system to store attachments to e-mails being processed by a mail scanning system of which the system illustrated in FIG. 1 forms part. It is assumed that the files applied to the input 1 have been subject to prior automatic filtering to filter out all those bar ones which are considered to be script files or macro files containing scripts.

The system 10, which may be implemented by means of a software automaton operates according to the following algorithm.

Algorithm
1. A script file is delivered to the input 1 for processing.
2. A 'gatherer' 2 analyses the program which the script defines and gathers together the program parts being analysed into groups, eliminating duplicates. Typical groups would be the group of all comments, the group of variable names, the group of subroutine names, the group of strings, but the invention is not limited to these particular groups.
3. The gathered group contents are then passed to a scorer 3, which will score each group as suspicious or not suspicious.
4. The scorer 3 selects the first group for processing at 4.
5. A frequency analyser 5 takes the contents of the group, counts the number of occurrences of each character, working out a frequency distribution histogram data set.
6. A matcher 6 takes this distribution from the analyser 5 and determines whether this has a close match with the distribution expected for the languages it knows about as recorded in a language database 7. If not, the group is provisionally flagged as suspect.
7. If there are groups left, go to step 4.
8. If there are no groups marked as suspect, finish processing by flagging the file to be treated as non-malware at an output 8.
9. The script is checked by an exception list matcher 9 to see if it can be ignored. This is, for instance, to ignore known scripts which flag as suspicious. If the script can be ignored, stop processing and flag the file to be treated as non-malware at output 8.
10. If processing arrives here, the script is flagged as malware, by activating a "treat as malware" flag at output 11.

Gatherer

One way of implementing gatherer 2 is as a process that parses the script, breaking it up into components. Components the system 10 is interested in, such as comments, strings and so on, are stored in groups for future analysis by the scorer 3. The gatherer 2 will need different parsing processes for different types of scripts. For instance, comments in PERL are introduced by the hash character, '#', while comments in Microsoft VBA (Visual BASIC for Applications) are introduced either by the word 'Rem', or by a single quote.

EXAMPLE

The following is an example VBA script

```
Sub Test( )
    Rem This is a test subroutine
    Rem It does not do much
        MsgBox "Hello World"
End Sub
Sub Test2( )
    Rem This another routine
    Rem It does not do much
        Dim var As Integer
        Dim AnotherVar as String
        Var = 7
        AnotherVar = "Hello"
        Var = Var + 3
End Sub
```

This would generate the following groups:

Group of comments
    This is a test subroutine
    It does not do much
    This another routine Group of routine names
    Test
    Test2

Group of strings
    Hello World
    Hello

Group of variable names
    var
    AnotherVar

Scorer
    The scorer 3 processes each group, and also consists of the frequency analyser and the matcher.

Frequency Analyser
    The frequency analyser 5 converts upper case letters to the equivalent lower case letter. It then counts the number of instances of each character code in each group, and calculates percentages. Analysis is not confined to single byte character sets, that is the frequency analyser 5 should be adapted to handle multi-byte character sets and Unicode.

EXAMPLE

If the group of strings is
    Hello World
    Hello

Then the frequency distribution will be

| | |
|---|---|
| a | 0 |
| b | 0 |
| c | 0 |
| d | 1 |
| e | 2 |
| f | 0 |
| g | 0 |

-continued

| | |
|---|---|
| h | 2 |
| i | 0 |
| j | 0 |
| k | 0 |
| l | 5 |
| m | 0 |
| n | 0 |
| o | 3 |
| p | 0 |
| q | 0 |
| r | 1 |
| s | 0 |
| t | 0 |
| u | 0 |
| v | 0 |
| w | 1 |
| x | 0 |
| y | 0 |
| z | 0 |
| space | 1 | and the percentage frequency distribution will be

| | |
|---|---|
| a | 0.00 |
| b | 0.00 |
| c | 0.00 |
| d | 6.25 |
| e | 12.50 |
| f | 0.00 |
| g | 0.00 |
| h | 12.50 |
| i | 0.00 |
| j | 0.00 |
| k | 0.00 |
| l | 31.25 |
| m | 0.00 |
| n | 0.00 |
| o | 18.75 |
| p | 0.00 |
| q | 0.00 |
| r | 6.25 |
| s | 0.00 |
| t | 0.00 |
| u | 0.00 |
| v | 0.00 |
| w | 6.25 |
| x | 0.00 |
| y | 0.00 |
| z | 0.00 |
| space | 6.25 |

Matcher

The matcher 6 compares the frequency distribution of the group as calculated by the frequency analyser 5, with the frequency distribution of known sets. Normally these sets will be written languages, such as English, German, Chinese and so on. Depending on the particular group, the matcher 6 may or may not take all or some punctuation into account. For instance, subroutine and variable names typically do not contain punctuation, and so punctuation will be ignored for these groups. However strings and comments typically would contain punctuation—especially spaces, and so punctuation will not be ignored for these groups.

Matching is done set by set by comparing the percentage frequency for each character, with the expected percentage frequency range for that character. If the frequency falls outside the range, an anomaly is recorded, and a count incremented. Once all characters have been processed, the anomaly count is checked, and if greater than a certain value, the group is flagged as not matching the set. Processing then continues with the next set. If the anomaly count is not greater than the certain value, the group is flagged as matching the set, and processing stops with the matcher recording the group was not suspect.

If no sets match, the group is recorded as suspect.

The allowed percentage frequency range for each character will be a function of the set (e.g. English), the actual character (e.g. 'E'), and the total number of characters in the group under test—a large group under test will be expected to have a better correlation than a small group. Sufficiently small groups are not expected to have good correlation, and there will be a cut off point where the function returns the limits as between 0% and 100%.

The allowed anomaly count will be a function of the set and the total number of characters in the group under test.

For instance, in English the letter 'e' might be expected to occur roughly 10% of the time. For a group of size 10,000 the function might return expected limits of 9.2% and 10.8%. For a group of size 1,000, the limits might be 7% and 12.5%.

Exception List

The exception list handler 9 implements rules which are used to eliminate false positives for known programs that are harmless but which may otherwise be accidentally marked as suspicious. The exception list rules can work in various ways, including but not limited to comparing the MD5 checksum of a file with a list of known checksums, or by searching the files for regular expressions. If an exception list match occurs, no further action is taken, beyond flagging the file as "treat as non-malware" at output 8.

Programs which are stopped as viral, but which do not turn out to be viral, can be analysed, and an exception list entry generated and added to the rules of exception list handler 9, so that similar false positives do not occur in future.

As well as using the system 10 as a stand-alone virus detection system, it can be combined with systems which implement other techniques as part of a larger system. For instance, programs flagged as viral by the system 10 may be allocated a certain score, or variety of scores depending on the exact circumstances, possibly to be taken into account in conjunction with scores taken from other systems. Different groups may be allocated different weightings (for instance, an anomaly in the group of strings may be more suspicious than an anomaly in the group of variables). Scores may also be assigned using other heuristic techniques, and only if the total score passes some limit is the program flagged as viral.

Extra long strings or arrays of strings may be considered as a separate group all by themselves.

Small sample sets may be ignored. For instance, if there are only ten variables, this may not be enough to analyse.

I claim:

1. A system implemented on a computer apparatus for scanning a computer file including source code of a computer program in a given computer language for malware, the system comprising:

means for separating the source code into groups of constituent parts, each group comprising parts of a different type of structural part of the program;

means for processing each group to count the number of occurrences in that group of characters of a character set to obtain a frequency distribution of characters in that group;

means for comparing the character frequency distribution of each group with an expected range of frequency distributions; and means for flagging the file as suspect or not depending on the result of one or more comparisons by the comparing means.

2. A system according to claim 1, wherein the flagging means is operative to flag the file as suspect if the comparing means detects that the frequency distribution of one or more of said groups does not match an expected range.

3. A system according to claim 1, wherein the flagging means is operative to flag the file as suspect depending on an accumulated score prepared by adding individual scores obtained in comparing each group with an expected frequency distribution.

4. A system according to claim 1, wherein, in operation of the comparing means, the range of distributions considered as representing an acceptable match for the group is varied depending on the number of characters either in part or the program as a whole, with fewer characters corresponding to a wide range.

5. A system according to claim 1, further comprising:
means for maintaining an exception list of files which by their contents are to be treated as exceptions;
means for identifying a file as being included in the exception list; and
wherein a file is not marked as suspect if it is identified as being on the exception list.

6. A system according to claim 1, wherein duplicates of constituent parts are ignored.

7. A method for scanning a computer file including source code of a computer program in a given computer language for malware, the method comprising:
separating the source code into groups of constituent parts, each group comprising parts of a different type of structural part of the program;
processing each group to count the number of occurrences in that group of characters of a character set to obtain a frequency distribution of characters in that group;
comparing the character frequency distribution of each group with an expected range of frequency distributions; and
flagging the file as suspect or not depending on the result of one or more comparisons by the comparing.

8. A method according to claim 7, wherein the flagging is operative to flag the file as suspect if the comparing detects that the frequency distribution of one or more of said groups does not match an expected range.

9. A method according to claim 7, wherein the flagging is operative to flag the file as suspect depending on an accumulated score prepared by adding individual scores obtained in comparing each group with an expected frequency distribution.

10. A method according to claim 7, wherein, in the comparing, the range of distributions which is considered as representing an acceptable match for the group is varied depending on the number of characters either in part or the program as a whole, with fewer characters corresponding to a wide range.

11. A method according to claim 7, further comprising:
maintaining an exception list of files which by their contents are to be treated as exceptions;
identifying a file as being included in the exception list; and
wherein a file is not marked as suspect if it is identified as being on the exception list.

12. A system according to claim 1, wherein the groups comprise at least one of a group of comments, a group of variable names, a group of subroutine names, and a group of strings.

13. A method according to claim 7, wherein duplicates of constituent parts are ignored.

14. A method according to claim 7, wherein the groups comprise at least one of a group of comments, a group of variable names, a group of subroutine names, and a group of strings.

* * * * *